May 24, 1938.  W. M. BRADSHAW ET AL  2,118,587
WATTHOUR METER
Filed Dec. 31, 1936
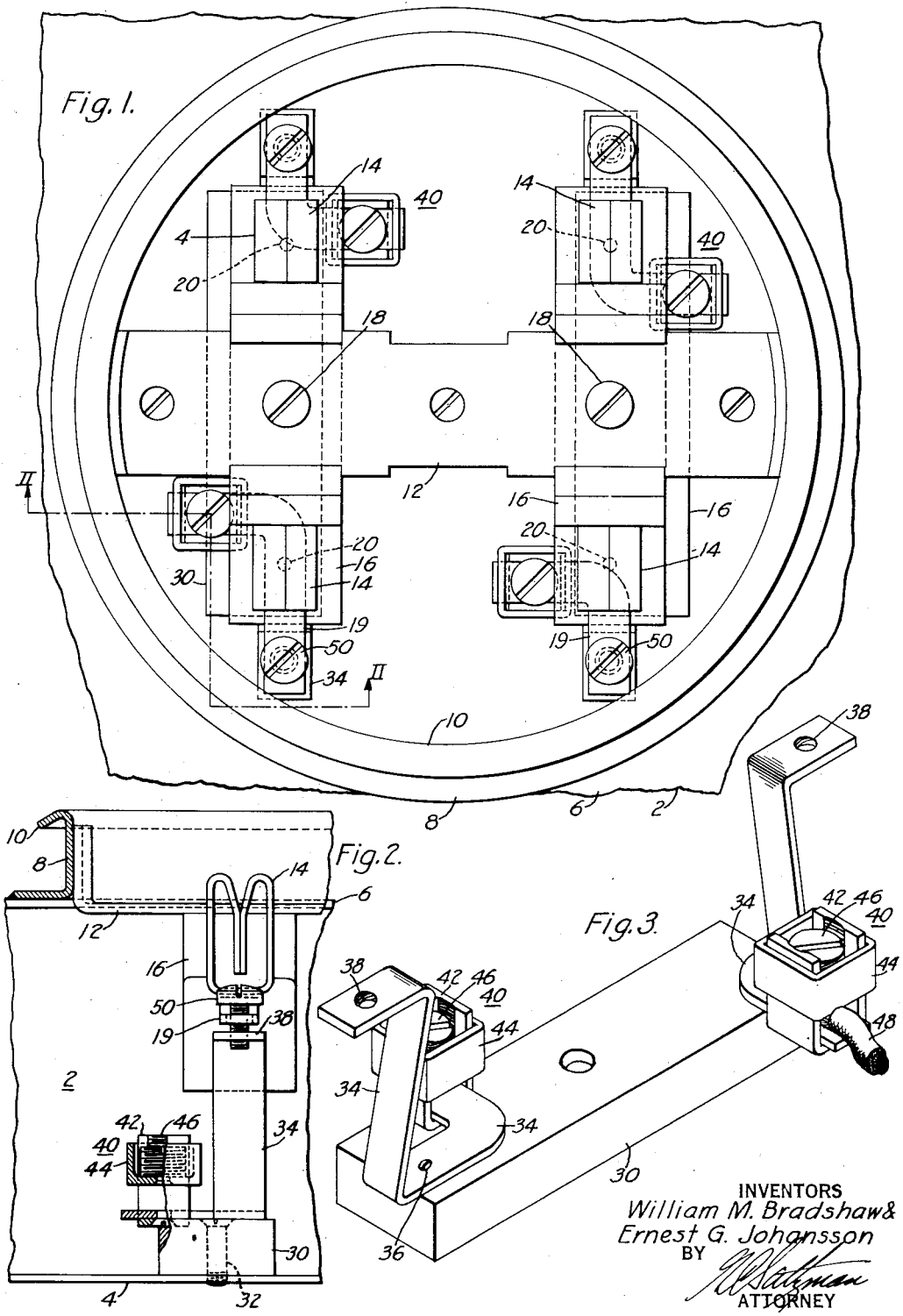
INVENTORS
William M. Bradshaw &
Ernest G. Johansson
BY
ATTORNEY Patented May 24, 1938

2,118,587

UNITED STATES PATENT OFFICE 2,118,587

WATTHOUR METER

William M. Bradshaw, Summit, N. J., and Ernest G. Johansson, Watertown, Mass., assignors of one-half to Westinghouse Electric & Manufacturing Company, East Pittsburgh, Pa., a corporation of Pennsylvania, and one-half to The Palmer Electric & Manufacturing Company, Waltham, Mass., a corporation of Massachusetts Application December 31, 1936, Serial No. 118,590

6 Claims. (Cl. 247—2)

The present invention relates to watthour meters and more particularly to an improved method of mounting a watthour meter of the so-called detachable type with reference to a support or receptacle.

The type of watthour meter to which the present invention is particularly adaptable is shown and described in Patent No. 1,969,499, issued August 7, 1934 to Bradshaw et al. In this type of construction, the encased meter element has contact blades projecting from the base of the casing for detachable association with complementary contact jaws connected to the line and load conductors of a circuit to be metered.

It is frequently desired to mount meters of the above character on a channel or trough to make a compact assembly for the various circuits of a building, such as an apartment house or office building, and in many cases to mount such meters on a receptacle or housing substantially larger than that shown in the above-identified patent so that other electrical apparatus or more elaborate circuit connecting devices may be sealed within the receptacle.

It is an object of the present invention to provide an improved mounting for watthour meters of the detachable type including means for facilitating the connection of such meters to the circuit to be metered and improved means for controlling such connection so that a consumer's load or service may be disconnected at will.

Other objects of the invention will be apparent from the following description and the accompanying drawing, in which:

Figure 1 is a plan view of a meter mounting, in accordance with the present invention, with portions broken away;

Fig. 2 is a view in section, with parts broken away, on the line II—II of Fig. 1; and Fig. 3 is a perspective view showing in greater detail, and on a larger scale, an element of the structure shown in the preceding figures.

Referring more particularly to the drawing, the support for a watthour meter comprises a receptacle 2 (Fig. 2), which may be part of a channel for mounting a plurality of meters or a casing for mounting only one meter, and comprises a base 4 and a front plate 6.

The front plate 6 is provided with a circular aperture, somewhat less in diameter than the base of a detachable meter, surrounded by an upstanding flange 8 suitably secured about the periphery of the aperture as by welding or riveting. The upstanding flange 8 is provided with a laterally extending peripheral flange 10 upon which the base of the meter casing may seat and be clamped thereto by a sealing ring of the type shown in the above-mentioned patent. A supporting strap 12 having upturned end portions extends across the aperture in the face plate 6 and the upturned end portions may be spot welded to the upstanding flange to maintain the strap rigidly in position, or the flange and strap may be formed integrally.

Contact jaws 14 are provided to receive the respective contact blades projecting from the base of the meter casing. The contact jaws are preferably mounted in pairs on blocks 16 of insulating material, each having a central aperture for receiving a bolt 18 extending through the strap 12 for maintaining the block tight against the strap.

Each jaw 14 is secured to an insulating block 16 by means of a strip 19 of conducting material extending through the base of the jaw and secured to the porcelain block by a bolt or screw 20, as indicated in dotted lines in Fig. 1. The detailed method of securing the jaw 14 to the block 16 is shown more in detail in Patent No. 2,071,936 issued February 23, 1937 on an application filed on behalf of W. G. Mylius, and constitutes part of the present invention only insofar as it is a part of the combination disclosed and claimed.

Each of the strips 19 extends beyond the base of the jaw and the edge of the block 16 and is provided with an aperture in the free end thereof for a purpose described below.

A plurality of terminal blocks 30, usually equal in number to the number of blocks 16, are secured to the wall 4 of the receptacle 2 opposite to the face 6 in which the aperture is provided. Such blocks 30 may be secured to the wall 4 by any suitable means, as by a screw 32 extending centrally through the block, as shown in dotted lines in Fig. 2.

Each of the blocks 30 is provided with two conducting straps 34 each comprising a member of substantially Z-shape having the lower leg secured to the block in any convenient manner, as by a screw or rivet 36 extending into the block. Referring more particularly to Fig. 3, it will be noted that the strap 34 extends upwardly from the face of the block and is provided with a threaded aperture 38 in the outwardly extending free end thereof.

The lower end of the strap 34 extends laterally of the block 30 for supporting a terminal clamp 40 comprising a member 42 of U-shape fastened at its base to the end of the strap 34 in any convenient manner, and which is provided with a collar 44 embracing the legs of the U, carrying with it a screw 46 in engagement with threads recessed into the inner faces of the legs of the U member 42. When the screw is turned down to clamp the conductor 48, member 44 is carried with it to prevent spreading of the legs of the U, resulting in an unusually strong and electrically efficient terminal clamp. The construction of the terminal clamp 40 is shown more clearly in section in Fig. 2.

Each block 30 is preferably disposed below and parallel to an insulating block 16, and the conducting straps 34 are so disposed and proportioned that the apertures 38 in the free ends thereof register with apertures in the free ends of the conducting strips 19. The aperture in the latter, however, is substantially larger than the threaded aperture 38 so that a machine screw 50 or the like may be loosely inserted through the strip 19 into threaded engagement with the aperture 38. The free end of the strap 34 preferably is slightly spaced from the end of strip 19 so that when the screw 50 is loosened, there will be an electrical separation of the ends of the two strips constituting an efficient means for breaking the electrical connection between the terminal 40 and the jaw 14.

In making an installation of the apparatus described, the blocks 30 are first secured in the channel or receptacle 2 and the circuit connections are made with the terminal clamps 40. Since the plates 6, and the jaw assembly 14, 16 are not yet in position, unobstructed access may be had to the clamps 40, thereby facilitating and cheapening the wiring operation. The plates 6 with the jaws 14 may then be positioned on the receptacle and by means of screws 50 the conducting straps 19 and 34 may be drawn together. A meter may then be mounted on the ring 8 and clamped thereto.

Preferably, although not necessarily, the blocks 30 and the terminal assembly are mounted in the channel or receptacle 2 at the factory to reduce the assembly expense at the installation, and the plates 6 with the contact jaw assembly are assembled at the factory and shipped as a unit. This facilitates making the installation at the consumer's premises because it is only necessary to secure the circuit leads to the terminals 40 and insert the screws 50.

If for any reason it is desired to disconnect a customer's supply, the meter may be removed, one or all of the screws 50 released to break the electrical connection to the jaw or jaws 14 and the meter reinserted and sealed in position to prevent the unauthorized reconnection of the supply.

The structure described is a simple one and has proven to be effective in actual practice. However, it is quite apparent that modifications may be made in the construction without departing from the spirit of the invention, and it is intended, therefore, that the invention shall be limited only by the scope of the appended claims.

We claim as our invention:

1. A meter mounting including a receptacle having an open side, a terminal block secured therein confronting said open side, terminal clamps secured to said block including conducting members extending therefrom toward said open side, a closure for said open side having an aperture therethrough proportioned to be closed by the base of a meter, a plurality of contact jaws and means for supporting them across said aperture in position to receive contact blades projecting from the meter base, said jaws each being provided with terminal means extending adjacent to, but spaced from, the free end of one of said conducting members, and means accessible only through said aperture for releasably securing such free ends to the respective jaw terminal means.

2. A meter mounting including a receptacle having an open side, a terminal block secured therein confronting said open side, terminal clamps secured to said block including conducting members extending therefrom toward said open side, a closure for said open side having an aperture therethrough proportioned to be closed by the base of a meter, a plurality of contact jaws and means for supporting them across said aperture in position to receive contact blades projecting from the meter base, said jaws each being provided with terminal means extending adjacent to, but spaced from, the free end of one of said conducting members, registering openings in each of said free ends and the respective terminal means, and means accessible only through said aperture and extending through said registering openings for drawing said free ends into contact with the respective jaw terminal means.

3. A meter mounting including a receptacle having an open side, a terminal block secured therein confronting said open side, terminal clamps secured to said block including resilient conducting straps extending therefrom toward said open side, a closure for said open side having an aperture therethrough proportioned to be closed by the base of a meter, a plurality of contact jaws and means for supporting them across said aperture in position to receive contact blades projecting from the meter base, said jaws each being provided with terminal means extending adjacent to, but spaced from, the free end of one of said conducting straps, and means accessible only through said aperture loosely engaging said terminal means and threaded into the respective free ends of the straps for releasably clamping them together.

4. In a meter mounting including a plurality of contact jaws exposed through an opening in a plate, each having a terminal strap projecting laterally thereof, and a receptacle to be closed by said plate; a terminal block secured within said receptacle to a wall thereof, a clamp secured to said block for receiving a circuit conductor, a terminal strap of resilient material extending from said clamp adjacent to but spaced from the free end of a jaw terminal strap when said plate is in receptacle-closing position, registering openings in said free ends, and means accessible only through said plate opening for releasably clamping said free ends together comprising a threaded member extending loosely through the opening in the jaw terminal strap and out of engagement therewith into threaded engagement with the free end of the clamp terminal strap, said plate opening being proportioned to be closed by the base of a meter of the type having contact blades projecting therefrom for engagement with said contact jaws.

5. In a meter mounting, a receptacle having an open side, a terminal block secured therein confronting said open side, terminal clamps mounted on said block for connection to circuit conductors, conducting straps each secured at one end to one of said clamps and having a free end spaced therefrom, means for closing said receptacle comprising a plate having an opening therethrough proportioned to be closed by a meter of the type having contact blades projecting from the base thereof, contact jaws for detachably receiving such meter blades and means for mounting them in said receptacle across said opening, conductors secured to said jaws having free ends extending toward but spaced from the free ends of said conducting straps, and means accessible only through said opening when the meter is removed for drawing together the free end of a conductor and the free end of a conducting strap to electrically connect them.

6. An electrical connector device comprising a housing, an instrument support mounted upon the housing, an electrical contact element carried by the support, an electric terminal carried by the housing, means for insuring electrical contact between the contact element and the terminal comprising a bracket secured to the terminal and having a portion thereof extending adjacent to the contact element, and pressure applying means for forcing together the contact element and the portion of the bracket adjacent thereto.

WILLIAM M. BRADSHAW.
ERNEST G. JOHANSSON.